(12) United States Patent
Meyer et al.

(10) Patent No.: US 9,759,573 B2
(45) Date of Patent: Sep. 12, 2017

(54) ROUTE BASED ENERGY CONSUMPTION ESTIMATION USING PHYSICAL MODELS

(71) Applicant: Ford Global Technologies, LLC, Dearborn, MI (US)

(72) Inventors: Jason Meyer, Canton, MI (US); Fling Finn Tseng, Ann Arbor, MI (US); Johannes Geir Kristinsson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 14/474,074

(22) Filed: Aug. 29, 2014

(65) Prior Publication Data

US 2016/0061611 A1 Mar. 3, 2016

(51) Int. Cl.
*G01C 21/26* (2006.01)
*G01C 21/34* (2006.01)

(52) U.S. Cl.
CPC ............... *G01C 21/3469* (2013.01)

(58) Field of Classification Search
USPC ...... 701/423, 411, 414, 424, 439, 31.4, 532; 705/7.14; 340/441; 702/142
See application file for complete search history.

(56) References Cited

U.S. PATENT DOCUMENTS

| | | | |
|---|---|---|---|
| 8,554,473 B2 | 10/2013 | Arcot et al. | |
| 2008/0221787 A1 | 9/2008 | Vavrus | |
| 2010/0049397 A1* | 2/2010 | Liu | G08G 1/096833 701/31.4 |
| 2011/0238457 A1 | 9/2011 | Mason et al. | |
| 2012/0004838 A1* | 1/2012 | Lee | G01C 21/3469 701/123 |
| 2012/0232783 A1 | 9/2012 | Calkins et al. | |

FOREIGN PATENT DOCUMENTS

| | | |
|---|---|---|
| EP | 2504663 A1 | 10/2012 |
| JP | 2009067350 A | 4/2009 |

OTHER PUBLICATIONS

The Impact of Stopping on Fuel Consumption, Victor Miller, Nov. 19, 2011.

* cited by examiner

*Primary Examiner* — Adam Tissot
(74) *Attorney, Agent, or Firm* — James P. Muraff; Neal, Gerber & Eisenberg LLP (57) ABSTRACT

This disclosure generally relates to a system, apparatus, method, and process for generating a route based energy consumption estimation based on physical models. More particularly, the disclosure describes the generation of the route based energy consumption estimation based on physical models for a vehicle traveling on a specific road segment. The energy consumption estimation may be based on information related to historical energy consumption information for the vehicle, external information that may affect energy consumption by the vehicle, vehicle systems information that may affect energy consumption by the vehicle, and/or selected road segment information that may be used to predict energy consumption by the vehicle.

11 Claims, 6 Drawing Sheets

ROUTE BASED ENERGY CONSUMPTION ESTIMATION USING PHYSICAL MODELS

TECHNICAL FIELD

This disclosure generally relates to a system, apparatus, method, and process for generating a route based energy consumption estimation based on physical models. More particularly, the disclosure describes the generation of the route based energy consumption estimation based on physical models for a vehicle traveling on a specific road segment. The energy consumption estimation may be based on information related to historical energy consumption information for the vehicle, external information that may affect energy consumption by the vehicle, vehicle systems information that may affect energy consumption by the vehicle, and/or selected road segment information that may be used to predict energy consumption by the vehicle.

BACKGROUND

A vehicle expends energy in order to generate the propulsion for moving the vehicle along a route. The energy expended by the vehicle may be considered in terms of energy consumption by the vehicle, wherein the vehicle's energy consumption may be measured in terms of fuel consumption, electric battery consumption, or some combination of the two, as well as other type of energy consumption capable of generating the propulsion for moving the vehicle.

As the demands for efficient energy consumption in vehicles rise, new methods for alerting the driver or other vehicle systems on potential energy conservation options may become important.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments provide an energy consumption tool for gathering a combination of one or more of historical information, vehicle information, external information, and road segment information to predict energy consumption for a particular vehicle. The energy consumption prediction may be generated for one or more available routes that are identified for reaching a known destination for the particular vehicle. This may allow a driver, or vehicle intelligence, to select one of the available routes, where the selected route may correspond to the route predicted to have the lowest predicted energy consumption.

According to some embodiments, an apparatus for predicting energy consumption of a vehicle is provided. The apparatus may include a memory configured to store road segment information for a road segment a vehicle is set to travel on, and a processor in communication with the memory. The processor may be configured to determine an estimated speed for the vehicle based on the road segment information, and generate an energy consumption profile for the vehicle traveling within the road segment based on the estimated speed.

According to some embodiments, a method for predicting energy consumption of a vehicle may be provided. The method may comprise receiving, by a processor, road segment information for a road segment the vehicle is set to travel on; determining, by the processor, an estimated speed for the vehicle based on the road segment information, and generating, by the processor, an energy consumption profile for the vehicle traveling within the road segment based on the estimated speed.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

With the ongoing emphasis to improve the energy consumption of vehicles, it has become important to inform drivers about specific performance levels for their vehicle, as well as to inform the drivers on how their operating decisions will impact the vehicle's energy consumption. Therefore, it is one of the goals of the innovation described in this disclosure to provide an energy prediction tool for providing an accurate energy consumption profile of the driver's specific vehicle for a selected driving road segment. The energy consumption profile may identify an energy consumption prediction (i.e., estimate) for the vehicle based on one or more of, historical information, vehicle information, road segment information, and/or external information. By having the energy prediction tool rely on such information when generating the energy consumption profile, the energy prediction tool may be capable of simply and robustly adapting to driving habits and ambient condition changes to generate new (i.e., updated) energy consumption profiles for the driver's vehicle as the driver is operating the vehicle towards a destination.

Further, it is recognized that in some embodiments, accurate historical driving information for a driver of the vehicle may not be available or may be unreliable. For example, the vehicle may be a newly bought vehicle such that historical driving information on the driver may not be readily available. In another example, the vehicle may be a rental vehicle, corporate lease vehicle, car dealership loader vehicle, or under some other type of program where the driver of the vehicle may be known to change. In such embodiments, the historical driving information may not accurately portray the current driver because the historical driving information may not be based on the current driver. However, even under such embodiments where the historical driving information may not be relied upon, the energy prediction tool may provide an accurate energy consumption prediction for the vehicle based on historical energy consumption information for the vehicle, external information that may affect energy consumption by the vehicle, vehicle systems information that may affect energy consumption by the vehicle, and/or selected road segment information. For example, the energy prediction tool may rely on a speed prediction model and stop prediction model in order to predict the energy consumption for the vehicle based, at least in part, on a predicted speed of the vehicle traveling along a road segment and a predicted number of stops for the vehicle as it travels along the road segment.

According to some goals, the energy prediction tool may be configured to distinguish between a vehicle that was cold started or warm started (e.g., related to temperature of the vehicle's engine block). The energy prediction tool may also be configured to separately predict the energy consumption for vehicle propulsion and non-propulsion functions. The energy prediction tool may also be configured to distinguish between available routes that have different rates of change in their elevation grades.

It follows that the energy prediction tool according to this disclosure will reference physically based models to predict the total energy (e.g., mechanical and/or electrical) consumption profiles for a vehicle that identifies a predicted energy consumption for the vehicle required to travel along a known road segment. The energy consumption tool may incorporate road segment information (e.g., posted speed limit, elevation, number of traffic stops) into an algorithm for generating the energy consumption profile for the vehicle. The energy prediction tool may also incorporate feed-forward compensation for engine warm-up considerations. The energy prediction tool may further include a transient and stead-state energy consumption model of a climate control system that is part of the vehicle's vehicle system. Further description for the energy prediction tool and how the energy prediction tool is configured to dynamically learn and compensate for driving habits when generating an energy consumption profile that includes an energy consumption prediction for the vehicle is provided in more detail below.

The energy prediction tool may be a program, application, and/or some combination of software and hardware that is incorporated on one or more of the components that comprise the vehicle's operating system. Further description for the energy prediction tool and the components of the vehicle's vehicle system running the energy prediction tool is described in more detail below.

For traditional petroleum based vehicles, the energy consumption prediction may be generated by the energy prediction tool in terms of an amount of petroleum fuel (e.g., gasoline, diesel fuel) predicted to be consumed in gallons, liters or other amount of measurable fuel usage, and/or in terms of an energy usage amount (e.g., kWh, Joules, or other similar unit of energy usage) by one or more vehicle batteries that are included in the vehicle system. For vehicles that rely, at least in part, on one or more batteries for powering the propulsion of the vehicle, the energy consumption prediction may be generated by the energy prediction tool in terms of amount of battery energy predicted to be consumed in terms of an energy usage amount (e.g., kWh, Joules, or other similar unit of energy usage) by one or more vehicle batteries that are included in the vehicle system. For battery and petroleum fuel hybrid based vehicles, the energy consumption prediction may be generated by the energy prediction tool in terms of an amount of petroleum fuel consumed and an amount of battery energy predicted to be consumed. For alternative fuel based vehicles (e.g., bio-diesel, solar power, liquefied petroleum gas, compressed natural gas, neat ethanol, fuel cells), the energy consumption prediction may be generated by the energy prediction tool in terms of an amount of the alternative fuel predicted to be consumed. It should be noted that is within the scope of the innovation described in this disclosure to apply to any one of the different types of vehicles running on the different energy sources described above, or other vehicle types running on an energy source to be utilized within the foreseeable future.

Figure 1:
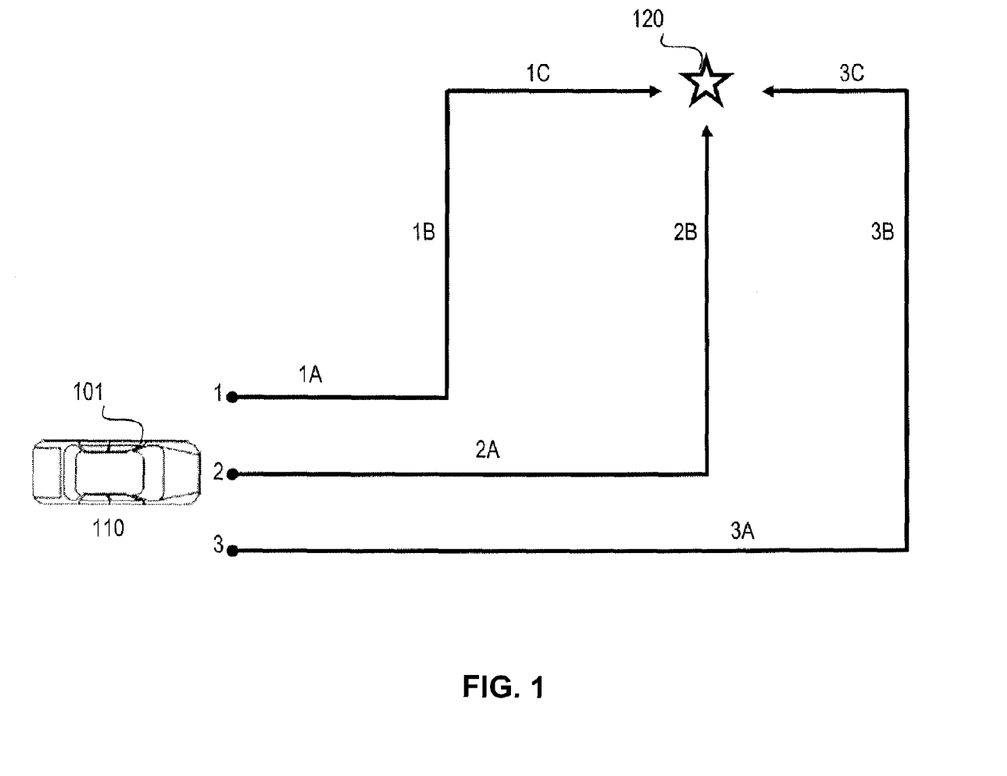
FIG. 1 illustrates an exemplary route planning display according to some embodiments.

The specific road segment for which the energy prediction tool generates an energy consumption profile may correspond to one or more available routes to a desired destination. For example, FIG. 1 illustrates an exemplary route planning display that identifies a vehicle 101 located at a starting location 110, and a destination location 120 representing a location where the driver of the vehicle has determined is a desired destination. In between the starting location 110 and the destination location 120, is a first route 1, second route 2, and a third route 3, where each of the routes represent available driving routes for the vehicle 101 to reach the destination location 120 when starting from the starting location 110.

The first route 1 may be comprised of a first road segment 1A, second road segment 1B, and a road third segment 1C. The second route 2 may be comprised of a first road segment 2A and a second road segment 2B. The third route 3 may be comprised of a first road segment 3A, a second road segment 3B, and a third road segment 3C. Although not specifically illustrated, there may also be another route comprised of a single road segment for reaching the destination location 120. Each road segment may be identified according to a road segment attribute that may include, but not be limited to, a specific road (e.g., part of a same street or road), speed limit (e.g., segment of road having a same speed limit, or a speed limit within a predetermined range), traffic congestion (e.g., a segment of road having a same traffic condition, or a traffic condition within a predetermined range of traffic conditions), road conditions (e.g., a segment of road sharing a same, or similar, road condition such as construction), road segment type (e.g., city road, country road, main road, neighborhood road, gravel road, paved road, concrete road, highway road, toll road), or other detectable road segment attribute.

In some embodiments the starting location 110 may correspond to a current location of the vehicle 101 obtained by the energy prediction tool via driver input, or via location information received from a GPS unit that is part of the vehicle's vehicle system. In some embodiments the starting location 110 may correspond to a location manually input by the driver that may not correspond to an actual current location of the vehicle. As for the destination location 120, the driver may manually input the destination location 120 via an input device that is part of the vehicle system, which will then be received by the energy prediction tool. It follows that the energy prediction tool may generate an energy consumption profile for an entire route (e.g., route 1, route 2, or route 3), for a specific road segment that is less than the entire route (e.g., any one of road segments 1A-1C, 2A-2B, or 3A-3C), and/or for any other measurable portion of a route based on a known attribute of the route. It follows that for the purposes of this disclosure, a road segment may refer to an individual road segment as described above, or to one or more road segments that comprise the entire route from, for example, the starting location 110 to the destination location 120.

The display in FIG. 1 may, for example, correspond to the energy prediction tool running as part of a vehicle navigation system included in the overall vehicle system. The display in FIG. 1 may, for example, alternatively correspond to the energy prediction tool running as an independent application as part of an infotainment component or vehicle navigation component of the vehicle system.

It follows that FIG. 1 displays an exemplary display where a current location 110 and a destination location 120 for the vehicle have been identified and received by the energy prediction tool. FIG. 1 also displays the available routes determined by the energy prediction tool for the vehicle 101 to start from the starting location 110 and reach the destination location 120. From the display of available routes (e.g., route 1, route 2, route 3), the driver may input a selection command to select one of the routes, upon which the energy prediction tool may generate an energy consumption profile for the selected route based on the procedures and methods described herein. Alternatively, in some embodiments the energy prediction tool may generate an energy consumption profile for one or more available routes prior to the driver inputting the selection command. In any case, the energy prediction tool may generate an energy consumption profile for one or more road segments according to the procedures and methods described herein.

Figure 2A:
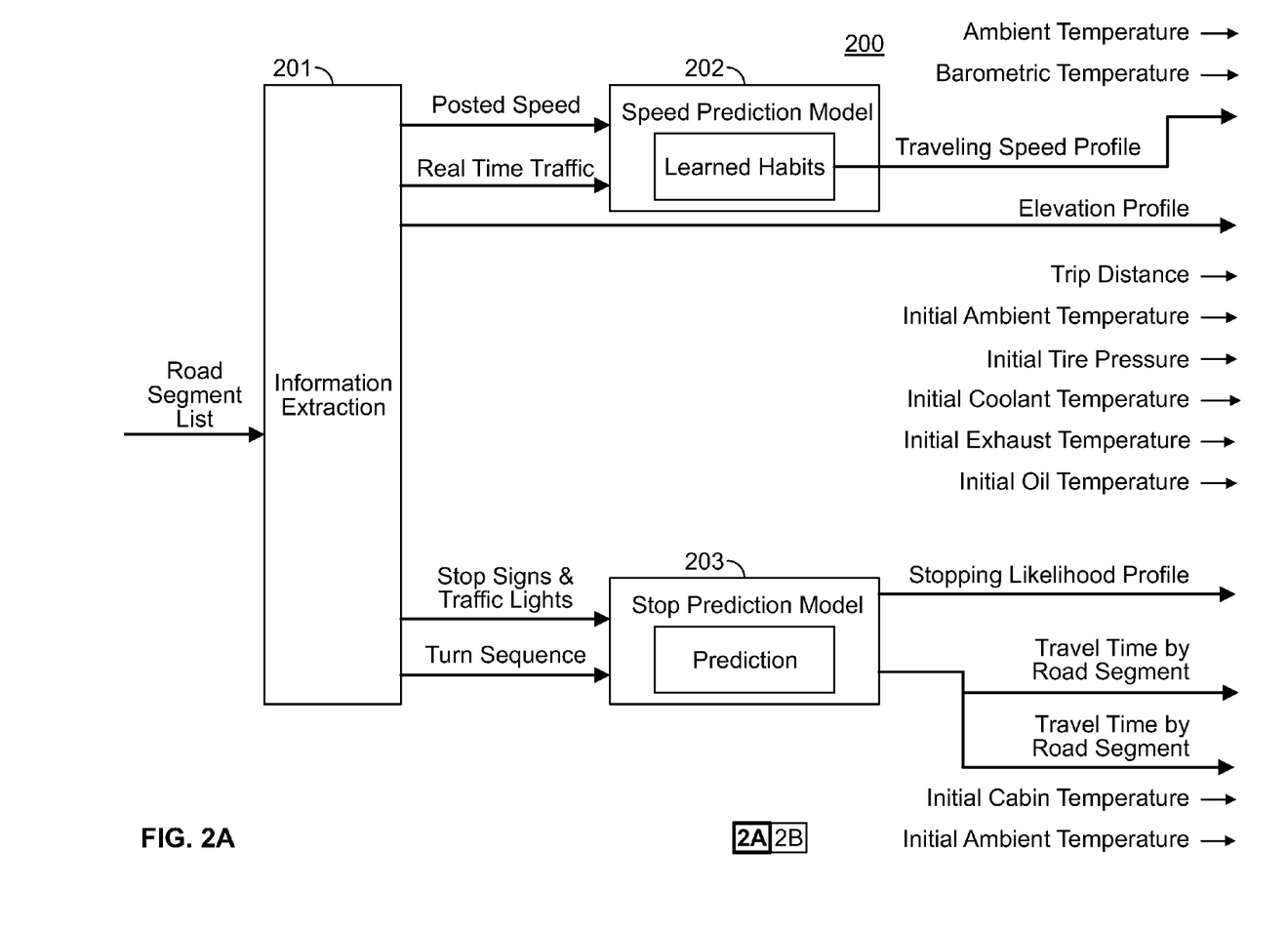
FIGS. 2A and 2B illustrates an exemplary block diagram describing a process for generating an energy consumption profile according to some embodiments.
Figure 2B:
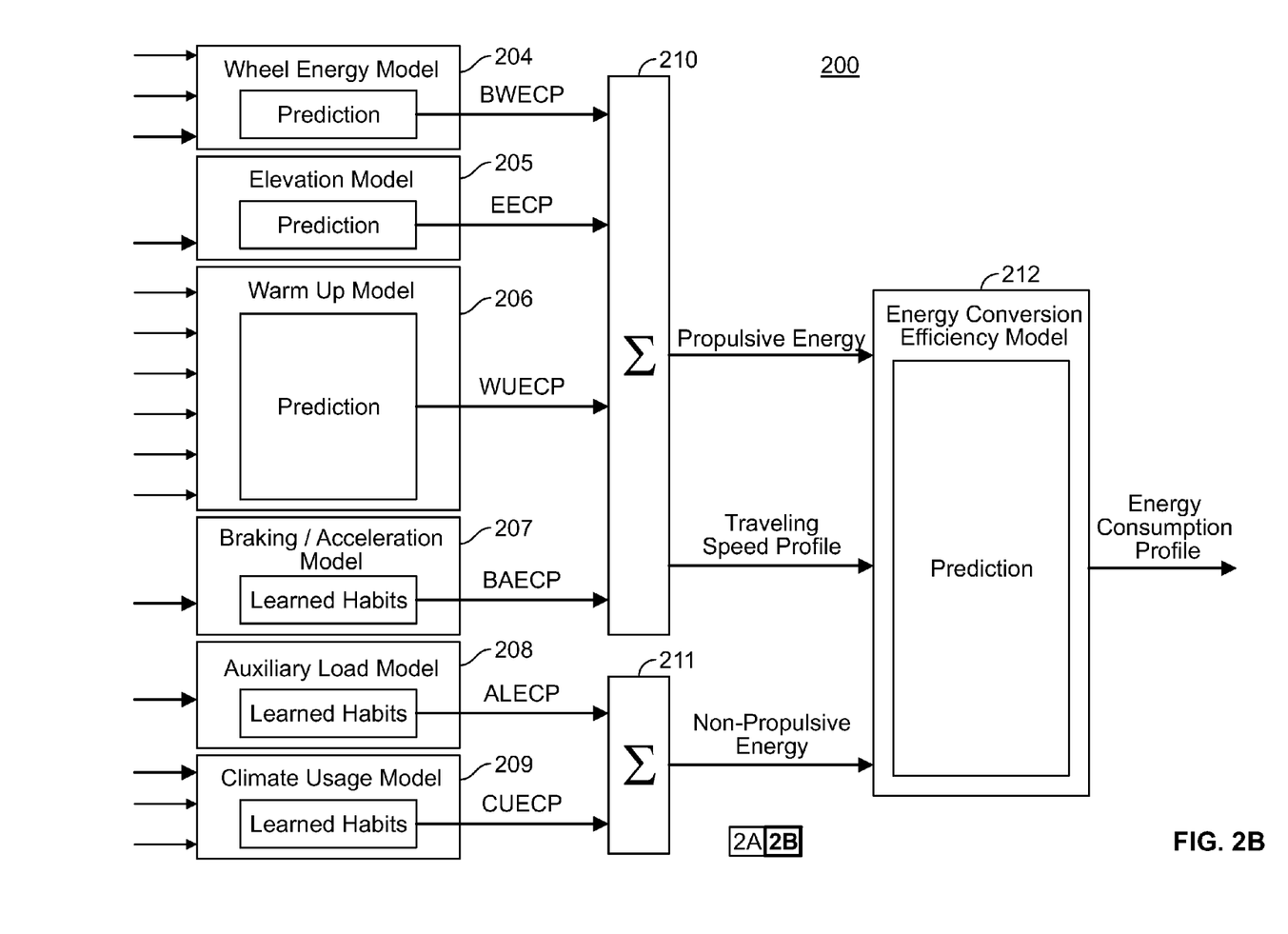

FIGS. 2A and 2B illustrates a block diagram 200 that describes a process, and the information referenced throughout the process, for generating an energy consumption profile for a specified road segment. Each of the components illustrated in FIGS. 2A and 2B may represent software, hardware, middleware, or some combination thereof that may be included as part of the energy prediction tool for generating the overall energy consumption profile for the vehicle 101.

At 201, the specified road segment is identified from a list of one or more road segments that may comprise a route. For example, the road segments that comprise the list may include entire routes (e.g., route 1, route 2, route 3) or smaller road segments (e.g., any one of road segments 1A-1C, 2A-2B, or 3A-3C). Based on the road segment identified from the list, the energy prediction tool further proceeds to extract road segment information at 201. The road segment information may include, but is not limited to, posted speed limit on the identified road segment, an elevation profile for the identified road segment, current and/or predicted traffic information for the identified road segment, road condition information for the identified road segment, weather information for the identified road segment, stop sign and traffic light information for the identified road segment, turn sequence information for the identified road segment, or some other identifiable road segment attribute for the identified road segment. The road segment information may be considered external information accessed by the energy prediction tool from a local database (e.g., database stored on a memory of the vehicle system), or accessed by the energy prediction tool from an external source via communication through a network connection.

Figure 3:
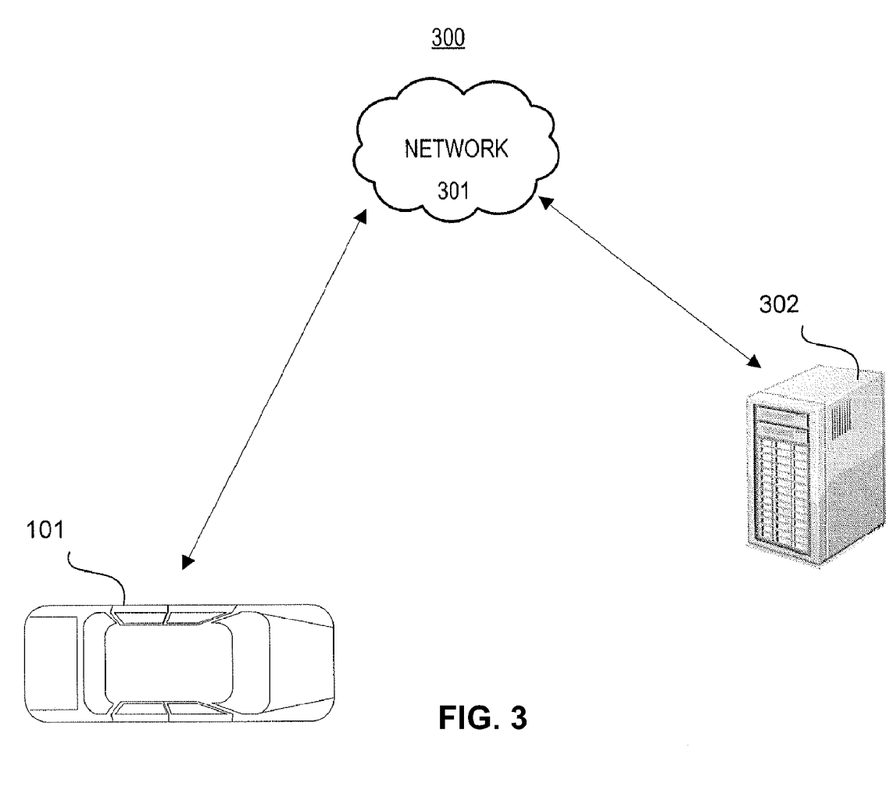
FIG. 3 illustrates an exemplary system for obtaining information according to some embodiments.

For embodiments where the road segment information is obtained from an external source, FIG. 3 illustrates an exemplary network system 300 comprised of the vehicle 101, a network 301, and an information server 302. The information server 302 may represent one or more external servers that store one or more of the road segment information described above. The energy prediction tool may be running on the vehicle 101 such that the energy prediction tool may control a communications interface of the vehicle system to communicate with the information server 302 via the network 301. The energy prediction tool may control a request for the road segment information to be transmitted to the information server 302 via the network 301. In response, the information server 302 may receive the request and transmit, via the network 301, one or more of the requested road segment information back to the vehicle 101 to be received by the communications interface of the vehicle 101. Once the road segment information is received and stored on a storage unit (i.e., memory) of the vehicle system, the energy prediction tool may then extract the road segment information, as illustrated at 201 in FIGS. 2A and 2B.

After extracting the road segment information at 201, the road segment information may be referenced by the energy prediction tool to determine individual energy consumption models. In some embodiments, additional information may also be referenced by the energy prediction tool in determining individual energy consumption models. Further description is provided below.

In terms of the individual models, a speed prediction model 202 may be utilized by the energy prediction tool to generate an estimated speed that is a prediction for a speed at which the vehicle 101 will travel along the identified road segment. The energy prediction tool may determine the estimated speed for the vehicle 101 based on posted speed limit information and traffic information that may have been extracted as part of the road segment information at 201. For example, the energy prediction tool may initially determine that a default speed for the vehicle 101 traveling along the identified road segment should equal the posted speed limit identified in the road segment information. The energy prediction tool may then analyze the traffic information included in the road segment information to adjust the default speed for the vehicle 101 traveling along the identified road segment in view of the traffic information. For example, the traffic information may identify construction or rush hour traffic along the identified road segment, which would be analyzed by the energy prediction tool to result in an average speed reduction from what was considered the default speed (e.g., posted speed limit). Therefore, based on this analysis the energy prediction tool may determine the estimated speed for the vehicle 101 traveling along the identified road segment as the posted speed limit adjusted in view of the traffic information. The estimated speed may have a value that corresponds to an average constant speed for the vehicle 101 for a duration of traveling along the identified road segment.

Alternatively, in an embodiment based on learned habits, the energy prediction tool may determine the estimated speed for the vehicle 101 based on traffic information and a historical speed at which the vehicle 101 has been driven when the speed limit is the speed limit identified in the road segment information. For example, the energy prediction tool may initially determine a historical speed for the vehicle 101 traveling on a road having a posted speed limit the same as, or similar to, the posted speed limit identified in the road segment information (e.g., historically, the vehicle may be found to travel 40 m.p.h. on average in a 35 m.p.h. road segment). The historical speed information may, for example, be looked up from a historical database stored on a memory of the vehicle system. The historical database may be continually updated to determine the average speed for the vehicle 101 traveling along road segments having various posted speed limits by tracking the speed of the vehicle 101 as it travels along different road segments having known posted speed limits. After obtaining the historical speed, the energy prediction tool may then analyze the traffic information included in the road segment information to adjust the historical speed determined for the vehicle 101 traveling along the identified road segment in view of the traffic information. For example, the traffic information may identify construction or rush hour traffic along the identified road segment, which would be analyzed by the energy prediction tool to result in an average speed reduction from what was considered the historical speed. The traffic information may alternatively identify a lack of traffic along the identified road segment, which would be analyzed by the energy prediction tool to result in an increase in average speed from what was considered the historical speed. In any case, based on this analysis the energy prediction tool may then determine the estimated speed for the vehicle 101 traveling along the identified road segment as the historical speed adjusted in view of the traffic information. The estimated speed may have a value corresponding to an average constant speed for the vehicle 101 for a duration of traveling along the identified road segment.

In either embodiment, the estimated speed may be included in a traveling speed profile and transmitted from the speed prediction model 202 to the wheel energy model 204.

A stop prediction model 203 may be utilized by the energy prediction tool to determine a stopping likelihood profile and a travel time estimate for the vehicle 101. The stopping likelihood profile may identify an estimated stopping duration time that the vehicle 101 is in a stopped state while traveling the identified road segment, and an estimated stopping probability for each traffic stop and/or stop sign identified in the road segment information for the identified road segment. For example, the energy prediction tool may determine the estimated stopping probability as a probability the vehicle 101 will stop at each stopping point along the identified road segment (e.g., traffic light, pedestrian crossing, school crossing, stop sign, or other traffic point where the vehicle 101 may potentially be required to stop). The energy prediction tool may determine the estimated stopped duration time as an estimated time the vehicle 101 may be in a stopped state at each of the stopping points along the identified road segment.

The energy prediction tool may, for example, determine the estimated stopping probability at a stop sign to be 100%, while the estimated stopping probability for a traffic light may be based on whether the vehicle 101 is determined to be turning left, turning right, or continuing straight through the traffic light. The energy prediction tool may, for example, determine the estimated stopping duration time for each stopping point to be based on the estimated stopping probability for the stopping point, and also based on whether the vehicle is determined to be turning left, turning right, or continuing straight through the stopping point based on the identified road segment and/or the overall selected route for the vehicle 101.

In this way, a final estimated stopping duration time may be calculated by the energy prediction tool as the product of the estimated stopping duration time and the estimated stopping probability for each stopping point along the identified road segment. The final estimated stopping duration time may be included by the energy prediction tool in order to generate the travel time estimate that is transmitted from the stop prediction model 203 to the auxiliary load model 208 and the climate usage model 209.

Further, the energy prediction tool may generate the stopping likelihood profile to include any one or more of the estimated stopping duration time, estimated stopping probability, or the final estimated stopping duration time for each stopping point along the identified road segment. The stopping likelihood profile may be transmitted from the stop prediction model 203 to the auxiliary load model 208 and the climate usage model 209.

A wheel energy model 204 may be utilized by the energy prediction tool to generate a base wheel energy consumption prediction that predicts an amount of energy that may be required to propel the vehicle 101 to traverse the identified road segment at the estimated speed included in the traveling speed profile received from the speed prediction model 202. In determining the base wheel energy consumption prediction, the energy prediction tool may further consider external information such as, for example, ambient temperature and barometric pressure. The external information may be obtained from vehicle sensors that are part of the vehicle system, or alternatively, the external information may be obtained from an information server 302 as described above with reference to the obtainment of the road segment information described herein.

In some embodiments as illustrated in FIGS. 2A and 2B, the energy prediction tool may analyze one or more of the estimated speed information, ambient temperature information, and barometric pressure information in order to determine the base wheel energy consumption prediction. For example, any one or more of the estimated speed information, ambient temperature information, barometric pressure information, or other known information or other information derivable from the information described may be analyzed by the energy prediction tool by being plugged into a predetermined formula for generating the base wheel energy consumption prediction. The predetermined formula may consider, for example, the mass of vehicle 101, identified road segment distance, estimated speed determined for the vehicle 101, air density, rolling resistance, and an aero dynamic drag coefficient in order to generate the base wheel energy consumption prediction.

Based on the analysis of the estimated speed information, ambient temperature information, and barometric pressure information as described above, the energy prediction tool may utilize the base wheel energy model 204 to generate the base wheel energy consumption prediction (BWECP) illustrated as resulting out of the wheel energy model 204.

The elevation model 205 is another exemplary model that may be utilized by the energy prediction tool. Specifically, the elevation model 203 may be utilized by the energy prediction tool to determine an elevation energy consumption prediction that predicts the potential energy consumed and gained by the vehicle 101 as the vehicle travels up and down different heights while traversing the identified road segment. The potential energy information as well as information identifying the elevation of the identified road segment may be received within an elevation profile from the extracted road segment information at 201. In some embodiments, the elevation energy consumption prediction may also take into consideration the effects of regenerative braking systems on the vehicle 101 that may be able to recoup some of the energy consumption. The energy prediction tool may analyze the information included in the elevation profile, and in some embodiments the effects of regenerative braking, by plugging such information into a predetermined formula for generating the elevation energy consumption prediction. The predetermined formula may consider, for example, the mass of vehicle 101, acceleration due to gravity, the elevation information for the identified road segment, and in some embodiments the effects of regenerative braking, to generate the elevation energy consumption prediction.

Based on the analysis of the elevation profile information, and in some embodiments the effects of regenerative braking, the energy prediction tool may utilize the elevation model 205 to generate the elevation energy consumption prediction (EECP) illustrated as resulting out of the elevation model 205.

The warm up model 206 is another exemplary model that may be utilized by the energy prediction tool. Specifically, the warm up model 206 may be utilized by the energy prediction tool to determine a warm up energy consumption prediction that predicts the amount of energy consumed to start up the vehicle 101. For example, the warm up energy consumption prediction may correspond to a prediction of the additional energy consumed during the warm up period for the vehicle 101 due to factors including increased oil viscosity and catalyst light off. Some of the factors received by the warm up model 206 for determining the warm up energy consumption prediction may include, but not be limited to, trip distance information, initial ambient temperature information, initial tire pressure information, initial coolant temperature information, initial exhaust temperature information, and initial oil temperature information. The trip distance information corresponds to a distance traveled by the vehicle 101 since start up of the vehicle 101, wherein the trip distance information may, for example, be obtained via driver input or reference to a distance measuring component (e.g., odometer) of the vehicle system. The initial ambient temperature may, for example, be obtained from vehicle sensors included within the vehicle system, or alternatively, the initial ambient temperature may be obtained from an external information server 302, as described above. The initial tire pressure information may, for example, be obtained from one or more tire pressure monitors included within one or more of the wheels included in the vehicle system. The initial coolant temperature may, for example, be obtained from one or more temperature sensors included as part of the vehicle system. The initial exhaust temperature may, for example, be obtained from one or more temperature sensors included as part of the vehicle system. The initial oil temperature may, for example, be obtained from one or more temperature sensors included as part of the vehicle system.

By analyzing a combination of one or more of the input information received into the warm up model 206, the energy prediction tool may utilize the warm up model 206 to generate the warm up energy consumption prediction (WUECP) illustrated as resulting out of the warm up model 206.

The braking/acceleration model 207 is another exemplary model that may be utilized by the energy prediction tool. Specifically, the braking/acceleration model 207 may be utilized by the energy prediction tool to determine a braking and accelerating energy consumption prediction for the vehicle 101 as the vehicle 101 travels along the identified road segment. As the vehicle 101 stops, or otherwise slows down, and then accelerates back to speed, energy is lost. In some embodiments where the vehicle 101 includes a regenerative braking system, some energy may be regained when the regenerative braking system is used during a braking operation. It follows that the braking/acceleration model 207 serves to predict an amount of energy that will be consumed due to the braking and accelerating of the vehicle 101 as it travels along the identified road segment. In order to generate the braking and accelerating energy consumption prediction, the braking/acceleration model 207 receives the stopping likelihood profile from the stop prediction model 203. The energy prediction tool may analyze the information included in the stopping likelihood profile by plugging such information into a predetermined formula for generating the braking and accelerating energy consumption prediction. The predetermined formula may consider, for example, a regenerative braking efficiency, mass of the vehicle 101, estimated speed information as determined according to any one of the processes described herein, estimated stopping duration time information, energy consumption information for when the vehicle 101 is stopped or idling.

Based on the analysis of the stopping likelihood profile, the energy prediction tool may utilize the braking/acceleration model 207 to generate the braking and acceleration energy consumption prediction (BAECP) illustrated as resulting out of the elevation model 207.

The auxiliary load model 208 is another exemplary model that may be utilized by the energy prediction tool. Specifically, the auxiliary load model 208 may be utilized by the energy prediction tool to determine an auxiliary energy consumption prediction that predicts an amount of energy required for the vehicle 101 to run various auxiliary loads during the course of traversing the identified road segment. The auxiliary loads may correspond to, but are not limited to, alternator loads or DC-to-DC converter loads resulting from headlights, interior lighting, audio system, infotainment system, speaker system, heated seats, solenoid valves, electric fans, vehicle control modules, sensors, climate blower fans, or other vehicle components that rely on a vehicle energy source (e.g., 12 Volt battery) to function. The auxiliary loads considered by the auxiliary load model 208 may correspond to one or more of the auxiliary loads the energy prediction tool knows is currently running on the vehicle 101, one or more of the auxiliary loads the energy prediction tool predicts will be running on the vehicle 101 during the course of traveling the identified road segment, or some combination of the two. The prediction of an auxiliary load may correspond to multiplying a distance or time the auxiliary load is predicted by the energy prediction tool to be running during the course of the identified road segment, and a known average energy consumption for the auxiliary load.

The auxiliary load model 208 may further utilize learned habits of the vehicle 101 in determining the auxiliary energy consumption prediction. For example, during the course of operation of the vehicle 101, the energy prediction tool may detect information identifying average energy consumption for powering one or more of the auxiliary loads described herein or otherwise known or capable of running on the vehicle 101. The energy prediction tool may then store the average energy consumption information related to the powering of the auxiliary loads as historical information within a database (e.g., stored on a memory storage unit) of the vehicle system such that the average energy consumption information may be accessed by the energy prediction tool at a later time. Therefore, such a database may include historical performance information for powering one or more of the vehicle components considered to be an auxiliary load on the vehicle 101. It follows that the energy prediction tool may access this database in order to look up historical average energy consumptions for one or more auxiliary loads known or predicted by the auxiliary load model 208 to be running during the course of traveling the identified road segment.

As illustrated, the auxiliary load model 208 receives the estimated travel time on the identified road segment information from 201. By then multiplying the estimated travel time to each of the historical average energy consumptions for the one or more auxiliary loads known or predicted to be running on the vehicle 101 while traversing the identified road segment, the energy prediction tool may obtain predicted energy consumption values for each of the auxiliary loads known or predicted to be running on the vehicle 101 while traversing the identified road segment. By summing each of these predicted energy consumption values, the energy prediction tool may utilize the auxiliary load model 208 to generate the auxiliary load energy consumption prediction (ALECP) illustrated as resulting out of the auxiliary load model 208.

It should be noted that the BWECP, EECP WUECP and BAECP are energy consumption predictions that predict an amount of mechanical energy that may be required to propel the vehicle 101.

The climate usage model 209 is another exemplary model that may be utilized by the energy prediction tool. Specifically, the climate usage model 209 may be utilized by the energy prediction tool to determine a climate usage energy consumption prediction for the vehicle 101 that relates to energy consumed by energy sources (e.g., battery or fuel) of the vehicle 101 to maintain climate control levels within the vehicle 101 while it traverses the identified road segment. For example, the climate usage model 209 may predict the amount of energy required to reach the vehicle cabin temperature set by a climate control system of the vehicle 101.

The climate usage model 209 may further utilize learned habits of the vehicle 101 in determining the climate usage energy consumption prediction. For example, during the course of operation of the vehicle 101, the energy prediction tool may detect information identifying average energy consumption for powering the vehicle 101's climate control system in order to maintain the vehicle cabin at one or more set temperatures. In some embodiments, the energy prediction tool may further take into account the outside temperature in comparison to the set vehicle cabin temperature when tracking the average energy consumption. The energy prediction tool may then store the average energy consumption information related to the powering of the climate control system as historical information within a database (e.g., stored on a memory storage unit) of the vehicle system such that the average energy consumption information may be accessed by the energy prediction tool at a later time. Therefore, such a database may include historical performance information for powering the climate control system at certain known set temperatures for maintaining the vehicle cabin. It follows that the energy prediction tool may access this database in order to look up historical average energy consumptions for known set vehicle cabin temperatures.

In some embodiments, the energy prediction tool may optionally consider whether one or more windows or sunroofs are in an up or down state to modify the historical average energy consumption information obtained from the database. For example, opened windows and/or sunroofs increase the predicted average energy consumption because the climate control systems may need to work harder to maintain the set vehicle cabin temperature.

As illustrated, the climate usage model 209 receives the estimated travel time on the identified road segment information from 201. By then multiplying the estimated travel time to the historical average energy consumption information obtained from the database described above, the energy prediction tool may obtain the climate usage energy consumption prediction. As illustrated in FIGS. 2A and 2B, the climate usage model 209 may also receive initial cabin temperature information and initial ambient temperature information. The initial cabin temperature information and initial ambient temperature information may then be considered by the climate usage model 209 to modify the climate usage energy consumption prediction based on the historical average energy consumption information obtained from the database. For example, the further away the initial cabin temperature and/or the initial ambient temperature is from the vehicle cabin temperature currently set into the climate control system of the vehicle 101, the more predicted energy may be added by the energy prediction tool to the energy consumption climate usage energy consumption prediction.

In some embodiments, the energy prediction tool may optionally apply a saturation compensation to ensure the climate usage energy consumption prediction does not exceed a capability of the vehicle's climate control system.

In this way, the energy prediction tool may utilize the climate usage model 209 to generate the climate usage energy consumption prediction (CUECP) illustrated as resulting out of the climate usage model 209.

It should be noted that the ALECP and CUECP are energy consumption predictions that predict an amount of energy for powering non-propulsive vehicle components and/or vehicle systems. The ALECP energy consumption prediction represents the amount of electric energy required to power the 12V battery system for the vehicle 101. The domain of the CUECP depends on the vehicle configuration. For electric vehicles with a high voltage electric A/C system or electric heating system, the CUECP estimate represents the amount of high voltage electric energy required to power the climate control systems. For a conventional vehicle, the cabin heating portion of the CUECP estimate represent the amount of heat energy extracted from the heat exchanger. On the other hand, the cabin cooling portion of the CUECP estimate represents the amount of mechanical energy required to operate the A/C compressor.

In general, each of the energy conversion efficiency models illustrated in FIGS. 2A and 2B determines how much source energy (e.g. gallons of fuel or watt hours of battery energy) is requires to provide energy to all of the system components taking into account the various conversion efficiencies. To satisfy the 12V energy loads, a conventional vehicle must first convert fuel energy into mechanical energy via combustion and then convert mechanical energy into electric energy via an alternator.

After generating the energy consumption predictions from one or more of the wheel energy model 204, elevation model 205, warm up model 206, braking/accelerating model 207, auxiliary load model 208, and climate usage model 209, a summation function may be implemented by the energy prediction tool at 210 and 211. For example, at 210 the energy prediction tool may implement the summation of the energy consumption predictions from the wheel energy model 204, elevation model 205, warm up model 206, and braking/accelerating model 207 to generate a propulsive energy consumption prediction. Further, at 211 the energy prediction tool may implement the summation of the auxiliary load model 208, and climate usage model 209 to generate a non-propulsive energy consumption prediction.

Then, the energy prediction tool may utilize an energy conversion efficiency model 212 in order to generate the energy consumption profile. The energy conversion efficiency model 212 receives the propulsive energy consumption prediction, non-propulsive energy consumption prediction, and traveling speed profile as input information. The energy conversion efficiency model 212 then applies known energy conversion efficiencies for the vehicle 101's power plant that is providing the energy, in order to generate the final energy consumption profile. For example, the energy conversion efficiency may be a measurement of how much energy that is provided to a vehicle component for achieving a vehicle function will be ultimately utilized to achieve the intended vehicle function during an energy conversion process. In other words, the energy consumption efficiency may be a measurement of energy consumption and energy loss during an energy conversion process. In order to apply the known energy conversion efficiencies, an energy efficiency database may be stored on a memory of the vehicle system that plots known energy conversion efficiencies for the vehicle power plant (e.g., a vehicle battery used for propelling the vehicle 101 or powering components of the vehicle system when the vehicle 101 is an electric or hybrid vehicle) as a function of a vehicle's speed (e.g., estimated speed of the vehicle 101 travelling the identified road segment that is included in the traveling speed profile, or the vehicle 101's speed as detected by a current speed measuring component). It follows that a lower energy conversion efficiency for the vehicle power plant may result in the propulsive energy consumption prediction and non-propulsive energy consumption prediction being adjusted higher to generate the final energy consumption profile in order to make up for the lower energy conversion efficiency.

It should be noted that the average energy consumption values described above based on the historical information may be average steady state energy consumption values. Further, the vehicle 101 may come preloaded with some baseline energy consumption estimates based on testing scenarios for a test vehicle that is the same, or at least similar, vehicle model as vehicle 101. The testing scenarios may correspond to detecting the energy consumption for the test vehicle under a variety of energy consuming operations such as driving the test vehicle at various speeds, driving the test vehicle under various loads, driving the test vehicle under various initial conditions, and driving the test vehicle under various external conditions. Some examples for the different scenarios for operating the vehicle are provided throughout this disclosure, however other scenarios are also within the scope of the innovation described herein. Then based on the different testing scenarios, energy consumption predictions may be obtained for the test vehicle operating under the various scenarios. The energy consumption predictions may then be stored as part of a database that may be preloaded onto a memory that is part of the vehicle system. It follows that this preloaded database may be referenced, analyzed, and utilized when generating the energy consumption profile according to any one or more of the processes described herein.

Although the above description was provided in terms of a road segment that is part of a route from a starting location 110 to a destination location 120, it is also within the scope of the present disclosure for the energy prediction tool to provide an energy consumption profile for any identifiable road segment. In other words, the energy prediction tool may provide an energy consumption profile for a road segment having known road segment attributes as described herein. For example, the energy prediction tool may provide an energy consumption profile during the operation of the vehicle, where the energy consumption profile is for a road segment the energy prediction tool knows, or predicts, the vehicle 101 will be traveling for at least a set distance.

Figure 4:
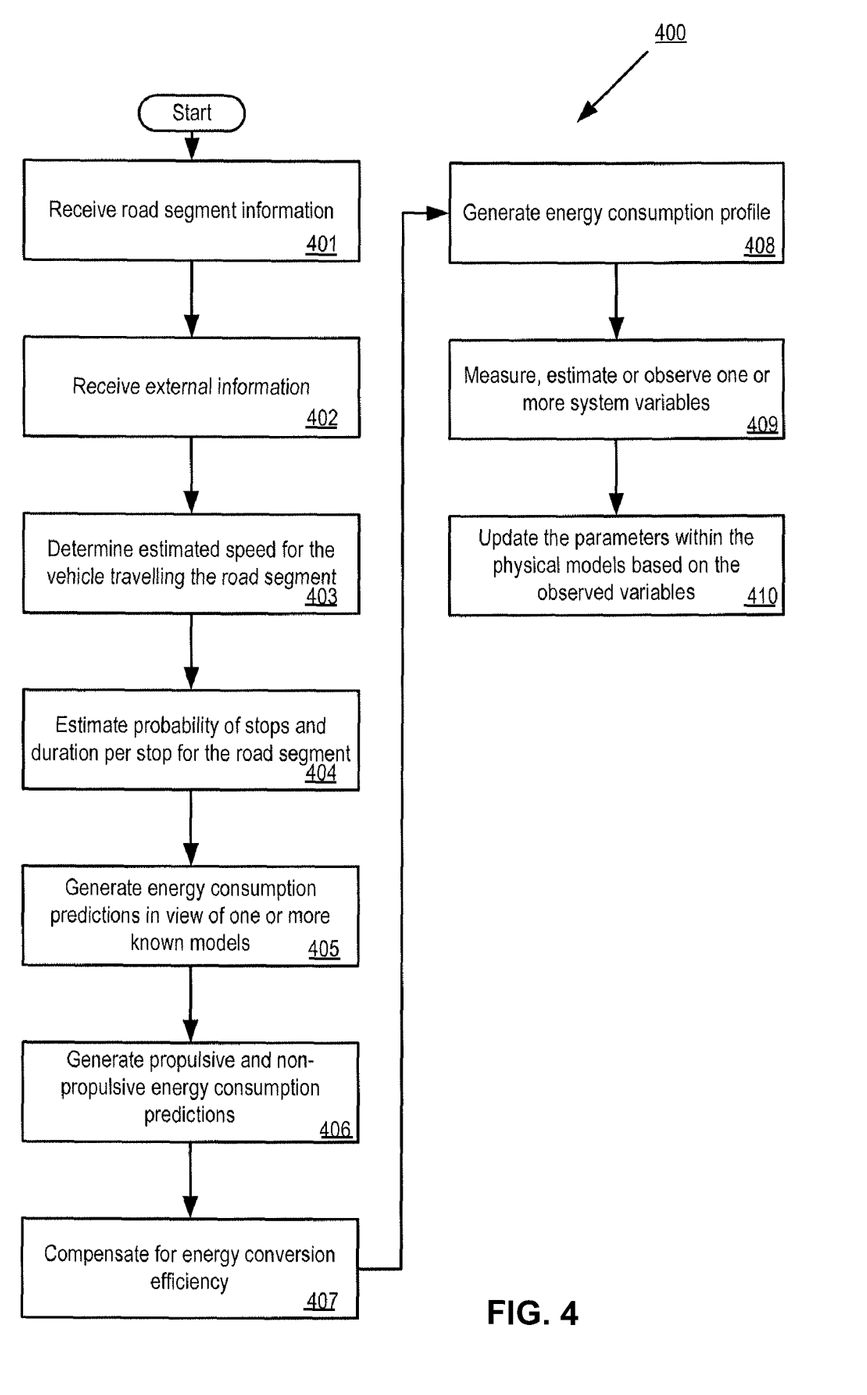
FIG. 4 illustrates an exemplary flow chart describing a process according to some embodiments.

FIG. 4 illustrates an exemplary flow chart 400 describing a process for the energy prediction tool according to some embodiments. The process described by flow chart 400 describes exemplary steps that may be implemented by the energy prediction tool for generating the energy consumption profile for the specific vehicle 101. The steps of the process described below is provided for exemplary purposes, as it is within the scope of this disclosure for the energy prediction tool to implement a greater, or fewer, number of steps in order to generate the energy consumption profile. Further description is now provided describing the flow chart 400.

At 401, the energy prediction tool may receive road segment information for the vehicle 101 according to any one or more of the processes described herein. For example, the energy prediction tool may receive the road segment information as described above corresponding to the road segment information extracted at 201 in the block diagram 200.

At 402, the energy prediction tool may additionally receive external information according to any one or more of the processes described herein. For example, the energy prediction tool may receive any one or more of the external information (e.g., ambient temperature, barometric pressure, trip distance, initial ambient temperature, initial tire pressure, initial coolant temperature, initial exhaust temperature, initial oil temperature, initial cabin temperature, GPS location data, real-time traffic data, route segment condition data) described above as being obtained by one or more components of the vehicle system and received by the energy prediction tool.

At 403, the energy prediction tool may determine the estimated speed for the vehicle 101 travelling along the identified road segment as described herein with reference to the speed prediction model 202 illustrated in FIGS. 2A and 2B.

At 404, the energy prediction tool may determine estimated stopping duration time and estimated stopping probability information as described herein with reference to the stop prediction model 203 illustrated in FIGS. 2A and 2B.

At 405, the energy prediction tool may generate one or more energy consumption predictions in view of any one or more of the models described herein. For example, the energy prediction tool may generate energy consumption predictions in view of any one or more of the wheel energy model 204, elevation model 205, warm up model 206, braking/accelerating model 207, auxiliary load model 208, and climate usage model 209 as described above with reference to the block diagram 200 illustrated in FIGS. 2A and 2B.

Then, at 406 the energy prediction tool may generate the propulsive energy consumption prediction based on the summation of one or more of the energy consumption predictions generated at 405. For example, the propulsive energy consumption prediction may implement the summation of the energy consumption predictions from the wheel energy model 204, elevation model 205, warm up model 206, and braking/accelerating model 207 to generate the propulsive energy consumption prediction as described with reference to the summation at 210 described herein. In addition, the energy prediction tool may implement the summation of the auxiliary load model 208, and climate usage model 209 to generate a non-propulsive energy consumption prediction as described with reference to the summation at 211 described herein.

At 407, the energy prediction tool may compensate for a known energy conversion efficiency for an energy source of the vehicle 101. The energy prediction tool may do so by applying known energy conversion efficiencies to the propulsive energy consumption prediction and non-propulsive energy consumption prediction as a function of the estimated speed as described herein with reference to the energy conversion efficiency model 212 illustrated in FIGS. 2A and 2B.

At 408, the energy prediction tool may generate an energy consumption profile for the vehicle 101 in view of the energy conversion efficiency applied at 407. For example, the energy prediction tool may generate the energy consumption profile after applying the energy conversion efficiency model 212 as illustrated in the block diagram of FIGS. 2A and 2B.

At 409, the energy prediction tool may measure, estimate, or observe one or more real world vehicle attributes that relate to an actual performance of the vehicle 101. For example, the energy prediction tool may measure or estimate any of the true values of the block outputs shown in FIGS. 2A and 2B. These vehicle attributes include, but are not limited to, intermediate attributes such as actual vehicle speed, actual propulsive energy (or actual wheel torque) and actual 12V power consumed and final vehicle attributes such as the actual amount of source energy consumed (e.g. gallons of fuel or watt-hours of battery energy) by any one or more of the vehicle components and/or vehicle systems.

At 410, the energy prediction tool may update parameters within the physical models based on the observed vehicle attributes from 409. Each of the models described in FIGS. 2A and 2B are configured to provide an energy consumption prediction based on algorithms rooted in physical laws, and thus the model algorithms for generating the energy consumption predictions do not need to be changed. However, not all of the variables that are input to the models, and therefore their respective algorithms for generating the respective energy consumption predictions, are constant and/or perfectly known. Vehicle mass or weight, for example, has a known impact on both the energy required to climb a grade and wheel energy by changing the rolling resistance, which will impact the EECP and BWECP respectively. Therefore, steps 409 and 410 allow the energy prediction tool to utilize feedback information to ensure that the estimated energy consumption matches the actual energy consumption. However, unlike previous innovations, the energy prediction tool according to this disclosure utilizes the feedback information to modify internal parameters for one or more of the models (e.g., models described in FIGS. 2A and 2B) rather than directly adjusting the vehicle energy consumption estimates. For example if the observed propulsive energy consumption profile (can be calculated from wheel torque and wheel/vehicle speed) does not match the predicted propulsive energy consumption profile, then the energy prediction tool may adapt the vehicle mass parameter within its models over time to ensure agreement. The combined effects of adapting these types of internal parameters ensure that the final estimated energy consumption profile remains accurate over the life of the vehicle and across a wide range of usage patterns.

It should be noted that the process described by flow chart 200 is provided for exemplary purposes, as it is within the scope of the innovation described by the disclosure provided herein to include a fewer, or greater, number of steps.

Figure 5:
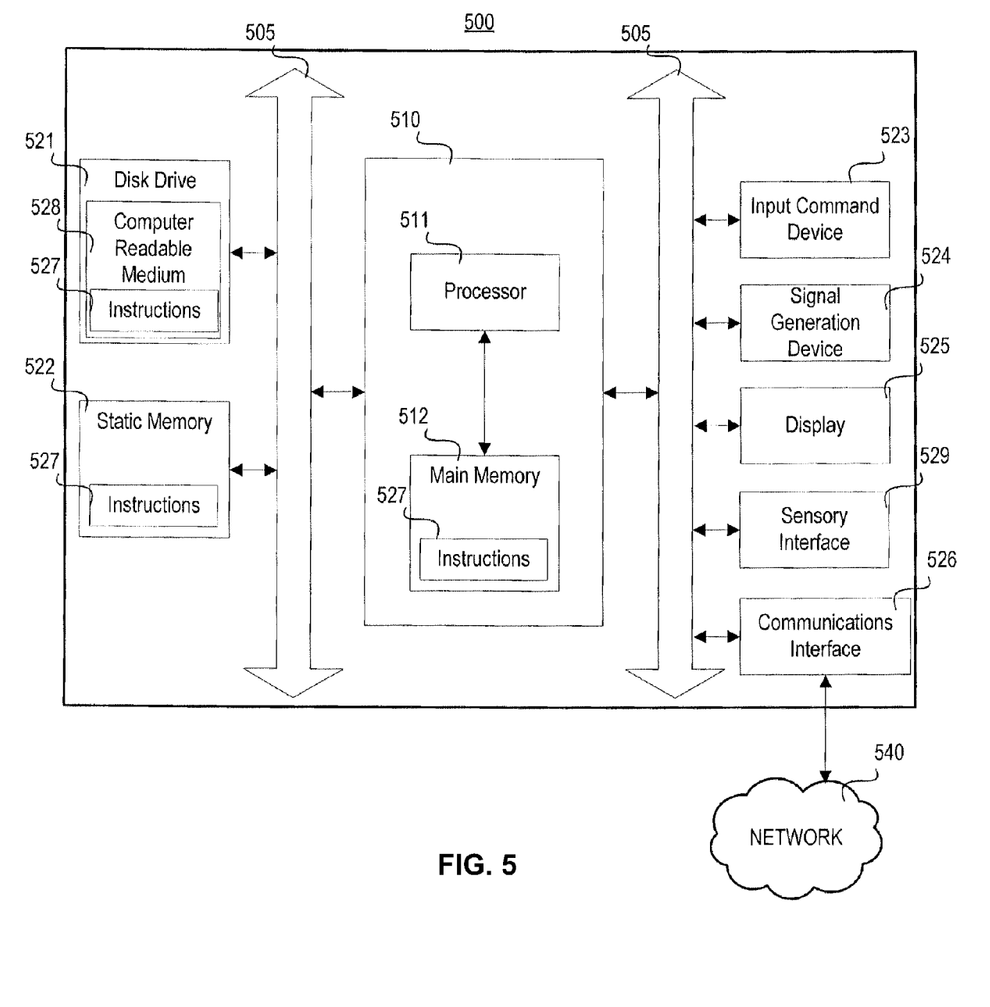
FIG. 5 illustrates an exemplary block diagram for a computing system that may be part of a vehicle system according to some embodiments.

Referring to FIG. 5, an illustrative embodiment of a computing system 500 that may be used for one or more of the devices shown in FIG. 3, or in any other system configured to carry out any one or more of the methods, features, and processes discussed herein, is shown and designated by the computing system 500. For example, the functional components of the vehicle 101 needed to implement the energy prediction tool may be implemented as the computer system 500. Also, the information server 302 illustrated in FIG. 3 may be implemented as the computing system 500.

The computing system 500 may include a processing unit 510 comprised of a processor 511 in communication with a main memory 512, wherein the main memory 512 stores a set of instructions 527 that may be executed by the processor 511 to cause the computing system 500 to perform any one or more of the methods, processes or computer-based functions disclosed herein. For example, the energy prediction tool described throughout this disclosure may be a program that is comprised of a set of instructions 527 that are executed to perform any one or more of the methods, processes or computer-based functions described herein such as the processes for generating the energy consumption profile for the vehicle 101. The computing system 500 may be mobile or non-mobile, operate as a stand-alone device, or may be connected using a network, to other computer systems or peripheral devices.

In a networked deployment, the computing system 500 may operate in the capacity of a server or as a client user computer within a vehicle in a server-client user network environment, or as a peer computer system within a vehicle in a peer-to-peer (or distributed) network environment. In addition to being a component within the vehicle system, the energy prediction tool may also be run on the computing system 500 that is implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computing system 500 can be implemented using electronic devices that provide voice, video or data communication. Further, while a single computing system 500 is illustrated, the term "system" shall also be taken to include any collection of systems or sub-systems that individually or jointly execute a set, or multiple sets, of instructions to perform one or more computer functions.

As illustrated in FIG. 5, the computing system 500 may include the processor 511, such as a central processing unit ("CPU"), a graphics processing unit ("GPU"), or both. Moreover, the computing system 500 can include the main memory 512 and a static memory 522 that can communicate with each other via a bus 505. As shown, the computing system 500 may further include a display unit 525, such as a liquid crystal display ("LCD"), an organic light emitting diode ("OLED"), a flat panel display, a solid state display, or a cathode ray tube ("CRT"). The display unit 525 may correspond to a display component of a navigation system, vehicle infotainment system, a heads-up display, or instrument panel of the vehicle 101. Additionally, the computing system 500 may include one or more input command devices 523, such as a control knob, instrument panel, keyboard, scanner, digital camera for image capture and/or visual command recognition, touch screen or audio input device, buttons, a mouse or touchpad. The computing system 500 can also include a disk drive unit 521 for receiving a computer readable medium 528. In a particular embodiment, the disk drive unit 521 may receive the computer-readable medium 528 in which one or more sets of instructions 527, such as the software corresponding to the energy prediction tool, can be embedded. Further, the instructions 527 may embody one or more of the methods or logic as described herein. In a particular embodiment, the instructions 527 may reside completely, or at least partially, within any one or more of the main memory 512, the static memory 522, computer readable medium 528, and/or within the processor 511 during execution of the instructions 527 by the processor 511.

The computing system 500 may also include a signal generation device 524, such as a speaker or remote control, and a sensory interface 529. The sensory interface 529 may be configured to receive information obtained by one or more sensors that are part of the vehicle system. For example, the vehicle system may include one or more temperature sensors located at various locations within the vehicle system for obtaining sensory reading information on engine fluid temperature, exhaust component and/or exhaust fume temperature, ambient temperature, engine block temperature, cabin temperature, barometric pressure, tire pressure, or vehicle speed. In some embodiments, the sensory interface 529 may also receive information identifying the state of certain vehicle components such as the state of window positions, sunroof positions, throttle positions, and other detectable states for vehicle system components.

The computing system 500 may further include a communications interface 526. The communications interface 526 may be comprised of a network interface (either wired or wireless) for communication with an external network 540. The external network 540 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the external network 540 may be a public network, such as the Internet, a private network, such as an intranet, or combinations thereof, and may utilize a variety of networking protocols now available or later developed including, but not limited to TCP/IP based networking protocols. For example, the external network 540 may correspond to the same network 301 described with reference to FIG. 3.

In some embodiments the program that embodies the energy prediction tool may be downloaded and stored on any one or more of the main memory 512, computer readable medium 528, or static memory 522 via transmission through the network 540 from an off-site server. Further, in some embodiments the energy prediction tool running on the computing system 500 may communicate with an information server via the network 540. For example, the energy prediction tool may communicate with the information server 302 via network 540 in order to receive any one or more of the external information described herein through the communication interface 526.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computing system 500. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. Accordingly, the disclosure is considered to include any one or more of a computer-readable medium or a distribution medium and other equivalents and successor media, in which data or instructions may be stored.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle, comprising:
batterie(s), a display, climate control, processor(s) configured to:
(a) calculate, for traffic stops along a predetermined route, stopping probability and stopping time;
(b) calculate an energy conversion efficiency of the batterie(s) based on (a);
(c) calculate a climate control energy consumption along the route based on (a) and (b);
(d) display an energy cost of the route to the batterie(s) based on (c).

2. The apparatus of claim 1, wherein the processor(s) are configured to project the energy conversion efficiency of the batterie(s) by referencing an energy efficiency database that relates a plurality of different vehicle speeds to a plurality of different energy conversion efficiencies.

3. The apparatus of claim 1, wherein the energy conversion efficiency of the battierie(s) relates energy consumed by the batterie(s) to energy supplied by the batterie(s).

4. The apparatus of claim 1, wherein the the processor(s) are configured to: determine whether vehicle window(s) are in an up or down state, and calculate the climate control energy consumption along the route based on the determined state.

5. The apparatus of claim 1, wherein the processor(s) are configured to:
determine, at each of said traffic stops, whether the route includes a left turn, a right turn, or continuing straight;
for each of said traffic stops, base the stopping probability and the stopping time on said determination.

6. The apparatus of claim 3, wherein the energy conversion efficiency mathematically compensates for energy loss that the batterie(s) incur in converting energy stored in a first form into electrical energy for powering the climate control.

7. The apparatus of claim 1, wherein the vehicle includes at least one component selected from the group of lighting components, audio system components, infotainment system components, speaker system components, heated seats components, solenoid valves components, electric fans components, vehicle control modules components, and sensor components; and the processor(s) are configured to: calculate energy consumption of said component based on (a) and (b).

8. The apparatus of claim 2, wherein the processor(s) are configured to project the energy conversion efficiency, at least in part, by referencing an entry in the energy efficiency database corresponding to a vehicle speed of zero.

9. The vehicle of claim 1, wherein the processor(s) are configured to: calculate the stopping probability and stopping time based on direction of the route at each of said traffic stops.

10. The vehicle of claim 9, wherein the processor(s) are configured to: calculate (a) based on determinations of route direction at each of said traffic stops.

11. A method, comprising:
via processor(s) of a vehicle having batterie(s), a display, and climate control:
calculating:
(a) stopping probability and stopping time for traffic stops along a predetermined route;
(b) an energy conversion efficiency of the batterie(s) based on (a);
(c) a climate control energy consumption based on (a) and (b);
displaying an energy cost of the route to the batterie(s) based on (c).

* * * * *